(12) United States Patent
Malkin et al.

(10) Patent No.: US 9,009,227 B2
(45) Date of Patent: Apr. 14, 2015

(54) FACILITATING MEETING INVITATION EXTENSION

(75) Inventors: Peter K. Malkin, Ardsley, NY (US); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/079,241

(22) Filed: Apr. 4, 2011

(65) Prior Publication Data

US 2012/0254305 A1    Oct. 4, 2012

(51) Int. Cl.
*G06F 15/16* (2006.01)
*G06Q 10/10* (2012.01)

(52) U.S. Cl.
CPC .................. *G06Q 10/1095* (2013.01)

(58) Field of Classification Search
CPC .............. G06F 2221/2115; G06F 2221/2141; G06Q 10/1095; G06Q 10/10; G06Q 10/109
USPC ......... 709/203, 204, 205, 217, 223, 224, 227, 709/228
See application file for complete search history.

(56) References Cited

U.S. PATENT DOCUMENTS

| | | | |
|---|---|---|---|
| 7,679,518 B1 | 3/2010 | Pabla et al. | |
| 2004/0047461 A1* | 3/2004 | Weisman et al. | 379/202.01 |
| 2004/0215535 A1 | 10/2004 | Leist | |
| 2006/0265262 A1 | 11/2006 | Kamdar et al. | |
| 2007/0112881 A1 | 5/2007 | Lyle et al. | |
| 2008/0046514 A1 | 2/2008 | Daughtry et al. | |
| 2008/0109517 A1* | 5/2008 | Sarkar et al. | 709/206 |
| 2008/0132252 A1* | 6/2008 | Altman et al. | 455/457 |
| 2008/0294999 A1 | 11/2008 | Bank et al. | |
| 2009/0063993 A1 | 3/2009 | Nyamgondalu | |
| 2009/0259718 A1 | 10/2009 | O'Sullivan et al. | |
| 2010/0106548 A1 | 4/2010 | Barnea et al. | |
| 2011/0184742 A1* | 7/2011 | Lynch | 705/1.1 |
| 2011/0270923 A1* | 11/2011 | Jones et al. | 709/204 |
| 2012/0005728 A1* | 1/2012 | Farrell et al. | 726/4 |
| 2012/0011205 A1* | 1/2012 | Paulsami et al. | 709/206 |
| 2012/0243536 A1* | 9/2012 | Fernandez Gutierrez | 370/390 |

FOREIGN PATENT DOCUMENTS

EP    1986142    10/2008

OTHER PUBLICATIONS

Knezevic et al., Synergy Distributed Meeting Scheduler, The University of Texas, 2008.

* cited by examiner

*Primary Examiner* — Barbara Burgess
(74) *Attorney, Agent, or Firm* — Scully, Scott, Murphy & Presser, P.C.; Preston J. Young, Esq.

(57) ABSTRACT

Enabling meeting extensions using an electronic meeting scheduling system may include enabling a second user invited to a meeting by a first user via an electronic meeting scheduling system to invite one or more third users to the meeting; and applying one or more meeting attributes set by the second user to said one or more third users.

19 Claims, 3 Drawing Sheets

FACILITATING MEETING INVITATION EXTENSION

FIELD

The present application relates generally to computing systems, consumer devices and appliances, for example, for the Internet or the World Wide Web, and to collaborative application or software.

BACKGROUND

Electronic calendar systems allow a user, for instance, referred to as a meeting leader to schedule a meeting between multiple participants and to reserve the required resources for the meeting. When the meeting takes place between people from separate locations (such as between people in different countries), the leader can usually schedule resources at his or her site or location but may not be able to schedule the resources at other sites or locations outside his or her site. Examples of resources include conference rooms and display equipment. Even if the leader can schedule resources at other sites, the complexity of scheduling grows with the number of locations.

For example, current calendar systems or applications do not allow participants from other sites to add resources to the existing entry corresponding to the meeting. An alternative is to have the people at other sites, if they want to add resources to this entry, to create a duplicate calendar entry and add resources at their site. However, any changes to the original calendar entry made by the leader are not visible in the duplicate entry without manual intervention by the creator of the second entry. Therefore, this method suffers from several synchronization problems.

BRIEF SUMMARY

A method and system for enabling meeting extensions using an electronic meeting scheduling system may be provided. The method, in one aspect, may include enabling a second user invited to a meeting by a first user via an electronic meeting scheduling system to invite one or more third users to the meeting. The method may also include applying one or more meeting attributes set by the second user to said one or more third users.

Examples of one or more meeting attributes may include, but not limited to, time duration within the meeting in which said one or more third users are invited to participate, or descriptive information associated with the meeting which said one or more third users can access, or combinations thereof.

A system for enabling meeting extensions using an electronic meeting scheduling system, in one aspect, may include an electronic meeting scheduling module operable to enable a second user invited to a meeting by a first user to invite one or more third users to the meeting, and allow the second user to set one or more meeting attributes to be applied to said one or more third users. A shared storage may store information associated with the meeting at least some of which is shared among the first user, the second user and said one or more third users.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Computer system and method in one embodiment of the present disclosure allow a second user invited to a meeting by a first user, to invite additional users and specify additional meeting locations and communications channels (e.g., teleconferencing numbers). That is, for example, invitees are enabled to extend a given invitation to their own local context (e.g., people and locations), and all modifications to the initial invitation can automatically flow down to all extended invitees.

It is desirable that this resource scheduling is done by someone local to the particular location since a meeting leader at his/her original meeting location might not be able to do so, or even if the leader can schedule resources at other sites, the complexity of scheduling would grow with the number of locations local to the particular location.

The system and method of the present disclosure in one embodiment provide multisite (multi-group) support in scheduling systems. In one embodiment, a leader of a meeting may pick a person from each site or group to be a sub-leader with special privileges. These privileges allow the sub-leader to add resources, add additional participants, and perform other functions from the sub-leader's site to the same main meeting entry (original meeting entry set up by the leader). Any changes to the main entry may be reflected to sub-leaders. The sub-leaders' entries may be modified automatically and all the participants may be notified accordingly. For example, if the leader adds a slide deck to the main entry, it may be shown automatically not only to the sub-leader but also to all people that the sub-leader may have invited. Also, for example, if the meeting is delayed (e.g., for an hour or other), the resources, including those entered by one or more sub-leaders, may be re-scheduled accordingly automatically.

In another embodiment, one or more people may declare themselves to be sub-leaders and perform the action described above. Yet in another embodiment, functionality may be provided for controlling the degree of visibility of information between the leader (also referred to as a chair or meeting chair) and the sub-leaders. For example, the leader of the meeting may be given the ability to modify, allow and/or disallow participants and resources requested by any sub-chair. Similarly, the sub-chair may be given such controlling authority over the invitees invited by the sub-chair. For example, the sub-chair may control the degree of information about the meeting that could be visible to the invitees, what the invitees may do in connection with the meeting, e.g., who can further invite or sub-chair. In such a way an original meeting may branch in a hierarchical manner into more invitees and sub-meetings. Permissions may be granted selectively as to who may perform selected functions associated with the meeting and who may view or receive what information about the meeting.

Figure 1:
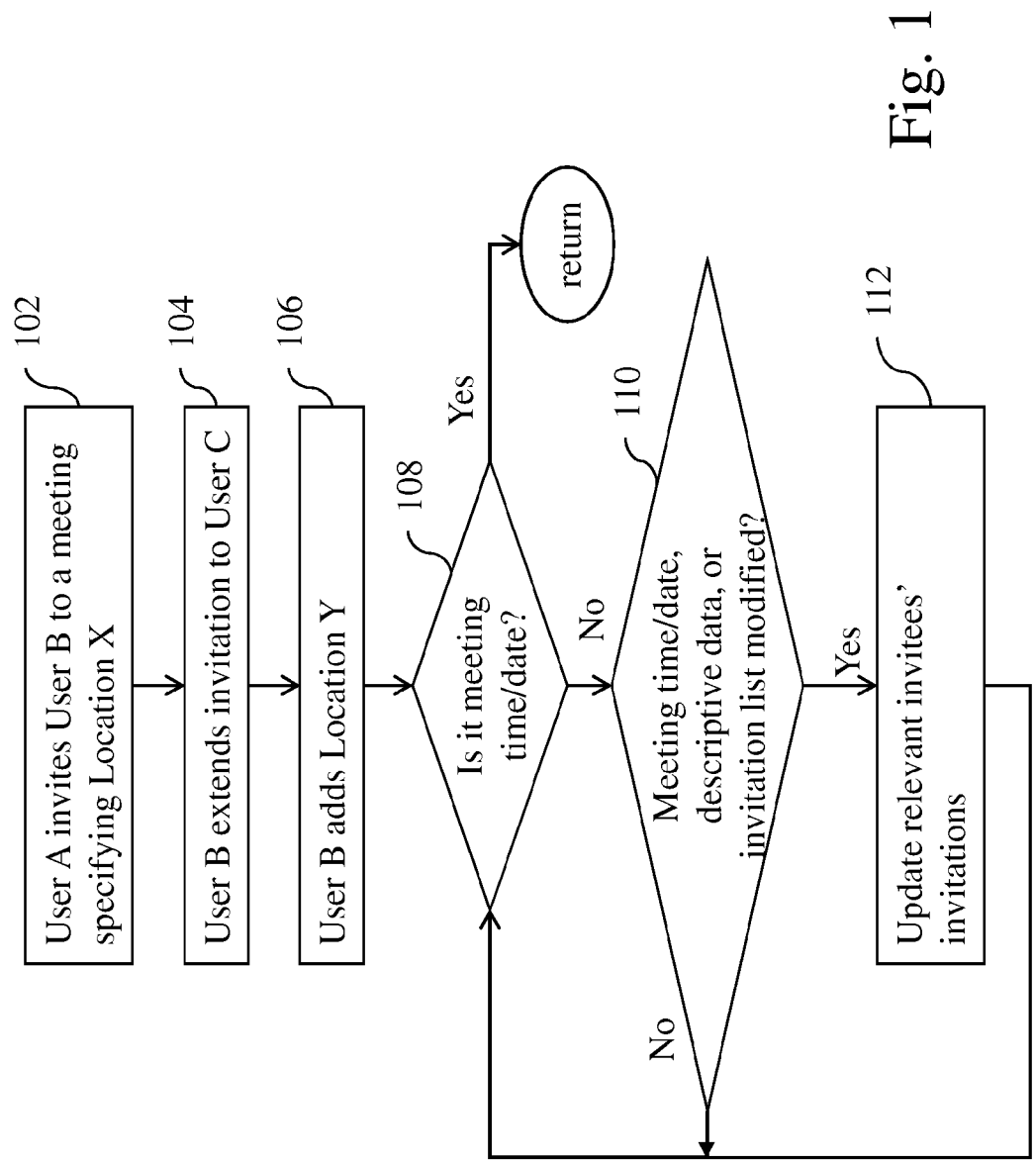
FIG. 1 is flow diagram illustrating a method of the present disclosure in one embodiment.

FIG. 1 is flow diagram illustrating a method of the present disclosure in one embodiment. At 102, a first user schedules a given meeting, inviting a second user. A computer module receives the information associated with the meeting scheduled by the first user and stores the information in a database or the like. The database in one embodiment is shared.

At 104, the second user that receives the meeting invitation is enabled to accept, and extend the invitation to one or more additional users. At 106, the second user is also enabled to specify an additional location and/or other resources for the meeting. For example, the second user may add a conference room in the second user's site or building. The relevant modifications to extend the invitation to additional users are stored in the shared database. Storing the information in the shared database in one embodiment allows the information about the second user's meeting extensions and resources to be available or accessible by the first user (original meeting organizer) and/or others who have access to the original meeting entry and whose access have been authorized by the first user.

At 108, if the meeting time has arrived, the meeting takes place. Otherwise, at 110, if there are any modifications (e.g., time, data, invitation list) to the meeting, at 112, the modifications are updated in the shared database. Updated modifications may be seen by all invitees. In another aspect, options may be set to allow some or all portions of the updated modifications to be viewable by some or selected invitees. Thus, in one embodiment, until the time of the meeting or until the meeting takes place, various modifications to the meeting entry may be made, and the information or some subset thereof may be viewable or sent to all invitees (or selected one or more invitees).

The following describes example use scenarios.

User A, located in City X invites User B, located in City Y to a meeting at a specified time. User A specifies both a location for the meeting (e.g., a conference room in a building in location X) and a call-in number. User B accepts User A's invitation. User B, having been authorized by User A to extend this meeting, specifies an additional location for the meeting in a conference room in location Y. User B then also invites User C to the meeting, User C being in location Y, with the original call-in information in this invitation. User C accepts User B's invitation. Once User C accepts the invitation, User C is added to the list of attendees in the calendar entry for the meeting, with User C being shown as having been invited by User B. When the specified meeting time arrives, and User B and User C meet in the location Y conference room, they dial in to the teleconferencing number specified by User A, and then proceed to attend the meeting together.

In another example, User A above may decide to add an agenda and set up data slides to the calendar entry for the meeting. This information is updated on User B and User C's calendar entries as well. Still yet, before the meeting date arrives, User B and his team are reassigned to a new project. Given this reassignment, User B declines his invitation. In response, all calendar entries related to the attendees User B invited (i.e., User C) are deleted. In turn, any other attendees that User C invited may be deleted as well.

Another example scenario may have User B specify that the attendance information associated with User B's extended invitation or sub-meeting not be communicated up to User A and User A's invitees (e.g., provided that User A allows such permission to User B). In this case, User A, and anyone else User A invites would only see User B as attending the meeting, and not the invitees to whom User B extended the invitation. User B would be given such capability to block User A, if for instance, User A (the original meeting) leader gave User B such authorization, for example, by setting User B's permission level at the time User A set up the original meeting and invited User B, or anytime thereafter.

A methodology of the present disclosure in one embodiment allows an invitee of a meeting to further extend the invitation to the same meeting to other invitees, and also to set up additional resources, for example, at the invitee's local facilities. In addition, options may be set that specify which users can further extend invitations and what information can be propagated to what other invitees.

Figure 2:
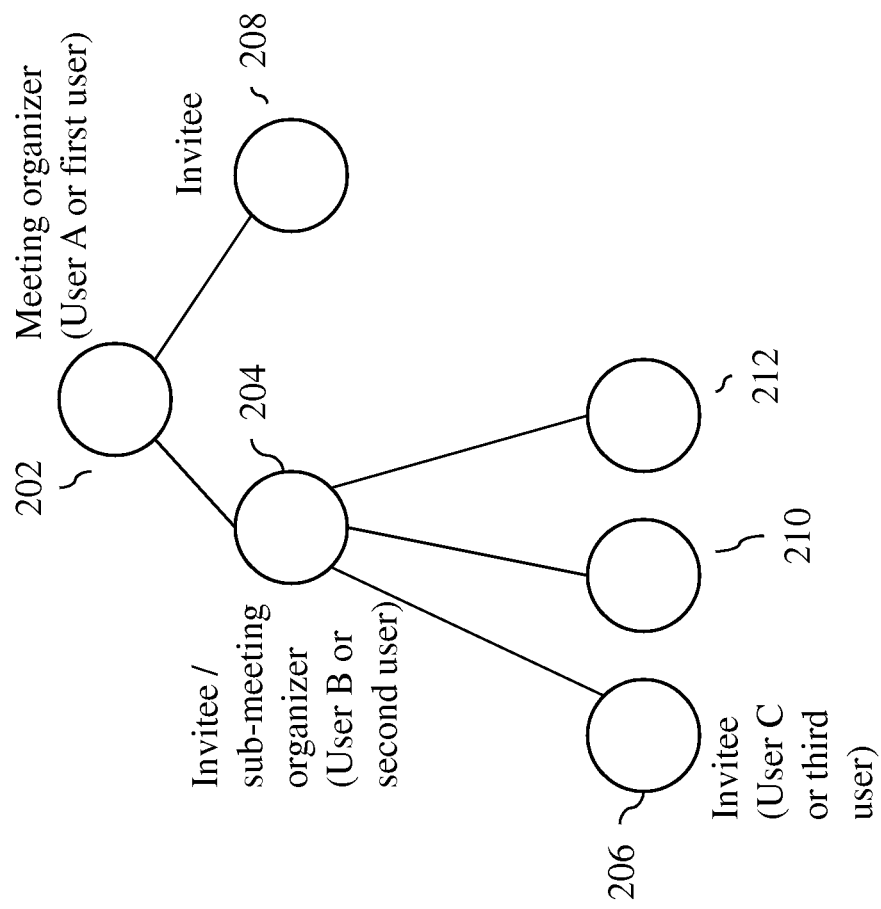
FIG. 2 illustrates an example hierarchical structure showing a meeting organizer and invitees in one embodiment of the present disclosure.

Ability to extend invitations by one or more invitees according to one embodiment of the present disclosure may be viewed hierarchically. FIG. 2 illustrates an example hierarchical structure showing a meeting organizer and invitees in one embodiment of the present disclosure. The node at 202 represents a user (e.g., a meeting organizer, a chair, or leader who sets up a meeting, referred to herein as a "first user" for clarity of explanation) inviting one or more other users 204, 208 (referred to herein as a "second user" for clarity of explanation) to a meeting, for example, teleconferencing, video conferencing, or other multimedia conferencing. The information about the meeting (e.g., date/time, data or presentation or discussion material related to the meeting or the like, list of invitees and/or attendees, and other information) may be stored in a shared database, e.g., that is accessible to the invitees of the meeting who accept the invitation. The invitees 204, 208 of the meeting inherit privileges and restrictions of the user who invited them to the meeting, e.g., 202, in the example shown in FIG. 2, as set by the first user. For instance, the first user 202 may set parameters as to which invitees can extend invitations, which invitees can add resources, which invitees can set communication channels (e.g., telephone conferencing, video conferencing, and/or others), and other privileges and restrictions.

A second user 204 who is invited by the first user 202 may accept the invitation to the meeting. The second user 204 may then invite one or more additional users (referred to herein as a "third user" for clarity of explanation) 206, 210, 212. In inviting one or more third users 206, 210, 212, the second user 204 may set privileges and restrictions as desired to apply to the second user's invitees 206, 210, 212. Thus, for example, the third users 206, 210, 212 may or may not have the full privileges and restrictions that the second user 204 inherited from the first user 202. The second user may create a sub-meeting within the original meeting duration set by the first user 202. For example, if the original meeting set by the first user 202 specified 12 pm-4 pm, the sub-meeting may specify a subset of duration of the original meeting, e.g., 1 pm-2 pm. In addition, the second user 204 may specify different privileges and restrictions to apply to different invitees 206, 210, 212. For instance, one invitee 206 may be invited for the whole duration of the original meeting, while another invitee 208 may be invited for only part of the duration. Thus, an invitee to an original meeting is enabled to create meeting entries with subset of attributes from the parent entry, for example, as to effect creation of sub-meeting from the original meetings. The third users 206, 210, 212 also then have ability to extend the invitation to other users, for example, fourth users down the hierarchy (not shown).

In the hierarchical structure shown in FIG. 2, invitees at different levels may inherit attributes as specified by their parents. Therefore, invitees at a certain level may inherit only a subset of the parent attributes, e.g., may have limited visibility to information, and/or be invited to only selected subset time periods of the meeting duration.

Various privileges and restrictions, or authorizations, may be set when a user invites another user to a meeting. For example, a user may authorize an invitee to extend the invitation to others, add one or more other meeting locations, set sub-meetings. Descriptive information for the original meeting may be posted in the shared database and according to the privileges and/or restrictions set, the posted information may be available to all extended invitations or to a subset of invitations. In addition, changes made to the original meeting may be propagated down to the invitees and sub-meetings. For instance, changes to the meeting time and date appear in all extended invitations; changes to the descriptive information for the original meeting may be posted to all extended invitations, i.e., all added users see any and all modifications to the descriptive information for the original invitation. In one embodiment, if changes are made to the sub-meetings, those changes may be posted up to the original meeting also. The first user may also specify whether or not the availability of extended users should be indicated to the first user or anyone else the first user invited.

In another embodiment, the second user (the invited user) may block the display of all of his/her invitation extensions in the invitations of all those invited by the first user, i.e., invitation extension information is not communicated up to those invitees invited by the parent other than the second user. The first user has control to allow this action by the second user. The second user may specify whether or not the third user's availability should be indicated to the first user and/or anyone else the first user invited.

Yet in another embodiment, the first user (the meeting originator) may block the display of all subsequent extensions to the meeting invitation, i.e., a user can block the display of all extensions to their own invitation.

Thus, for example, referring to FIG. 2, a first user who organizes a meeting (202) may enter one or more invitees (e.g., 204, 208), and also set privileges and/or restrictions that each invitee has, for instance, as parameters or options associated with each invitee. For example, the first user (202) may specify that an invitee (204) may view all information posted about the meeting, or only selected information. The first user (202) may specify that the invitee (204) may create a sub-meeting and/or invite additional invitees (e.g., 206, 210, 212), and also specify whether or not (and/or which one of) those additional invitees could view all information posted about the meeting, or view only selected information. The first user (202) may also specify that invitee (208) could not extend the invitation, i.e., invite any more invitees.

The invitee (204) who is given an option to be able to extend the invitation may extend the invitation to additional invitees (e.g., 206, 210, 212). Those invitees (e.g., 206, 210, 212) may inherit the options given to the invitee (204) by the first user (202). In addition, the invitee (204), referred herein as a second user, may also set privileges and/or restrictions with respect to the second user's invitees (e.g., 206, 210, 212). For instance, the second user (204) may specify whether all information or selected information may be visible to which one or more of the invitees (e.g., 206, 210, 212). Thus, the visibility of the information about the meeting may be specified by a user setting up a meeting or inviting others to a meeting.

Those options may be modified or updated after the time of setting up the meeting. In one embodiment of the present disclosure, the information about the meeting and the privileges and/or restrictions given to invitees may be stored in a shared database. In this way, each client application running on respective user's device accesses the shared database to determine corresponding access privileges and/or restrictions and functions accordingly.

If an invitee is removed from the meeting, e.g., uninvited by the user who invited the invitee or the invitee drops out of the meeting, all extended invitations extended by that removed invitee may be also deleted.

FIG. 2 shows an example hierarchy of invitations (first, second and third users). However, it should be understood that the present disclosure is not limited to any particular hierarchy. For instance, more levels may be created by the third users inviting one or more invitees, and so forth, according to their given permissions or authorizations. Yet as another example, another one of the first user's invitees (if any, for example, the invitee at 208) may extend invitations to his/her invitees, creating another sub-tree in the hierarchy of invitations.

The invitation may provide indication of who invited whom, e.g., in an invited user list: User_A, User_B, {User_C: User_D} indicates that while the originating user (the first user) invited User_A, User_B and User_C, User_C, then invited User_D. Other formats are possible to provide such indication.

The invitation may provide indication of who added a given location, e.g., in a location list: Location_A, {User_C: Location_B, Location_C} indicates that while the originating user (the first user) specified Location_A, User_C, then added Location_B and Location_C. Other formats are possible to provide such indication.

Figure 3:
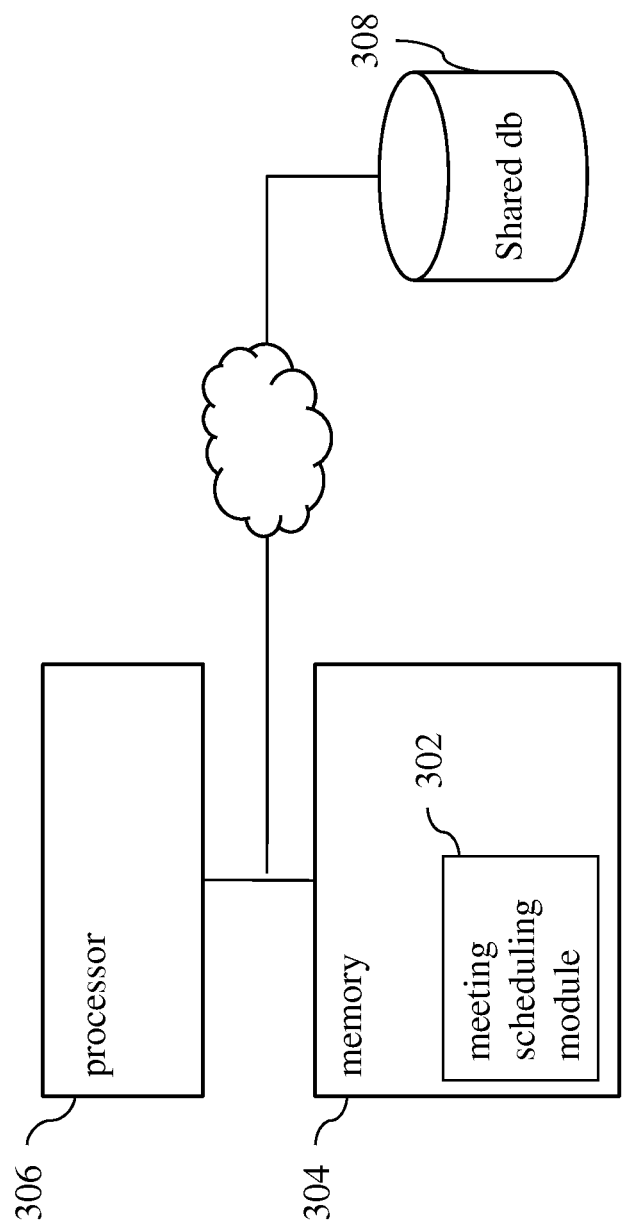
FIG. 3 is a block diagram showing components of the present disclosure in one embodiment.

FIG. 3 is a block diagram showing components of the present disclosure in one embodiment. A methodology of the present disclosure may be implemented as a computer module 302, for example, loadable into memory 304 and executable by a processor 306. The computer module 302 may be part of a calendar application or software, for instance, which enables one or more users to schedule a meeting. Information entered and set in the computer module 302 may be stored in a shared database 308 and shared between a meeting organizer and one or more invitees. In one aspect, each user may be running the computer module 302 (at least a client application of a client/server system) at each user's location, communicating remotely over a network such as LAN, WAN, Internet or others. Each user's application, e.g., accesses the shared database and determines its access privileges and/or restrictions that apply to the user, and functions according to those privileges and/restrictions. For instance, if a user is invited only to a sub-time period of a meeting rather than the entire period, that user's application would only show to the user a meeting time and duration for that sub-time period. The user may not know that he or she is invited to a sub time period. For example, if a first user invited a second user to a meeting scheduled from 1 pm to 5 pm, and the second user invites a third user to the same meeting but only from 1 pm to 2 pm, the third user's client application would determine from the shared database that the third user is invited for the meeting from 1 pm to 2 pm, and present the same to the third user. Thus, the third user may not be aware that the original meeting is set up from 1 pm to 5 pm.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of enabling meeting extensions using an electronic meeting scheduling system, comprising:

enabling, via the electronic meeting scheduling system, a second user invited to a meeting by an invitation from a first user via an electronic meeting scheduling system to invite, by using an extended invitation, one or more third users to the meeting;

creating, based on the invitation from the first user and the extended invitation by the second user, a hierarchical data structure that represents the first user invitation and the extended invitation;

preventing a notification of the extended invitation from being sent to said first user and invitees invited by said first user other than said second user;

applying one or more meeting attributes, set by the second user, to said one or more third users; and automatically sending, via the electronic meeting scheduling system and according to the created hierarchical data structure, one or more modifications made to said one or more meeting attributes to said one or more third users, wherein the meeting is one of a multimedia conference, a teleconference, a video conference and an audio conference, and said one or more meeting attributes include one or more of: at least time duration of the meeting, time duration within the meeting during which said one or more third users are invited to participate, descriptive information associated with the meeting which said one or more third users can access wherein a processor coupled to a memory device perform the steps of: enabling, creating, preventing, applying, and sending.

2. The method of claim 1, further including:

allowing the second user to add another location to the meeting or set another communication channel for the meeting or combinations thereof.

3. The method of claim 1, wherein said one or more modifications include: changes to time and date of the meeting, changes to descriptive information associated with the meeting, changes to a list of invitees, changes to the time duration of the meeting, changes to the time duration within the meeting during which said one or more third users are invited to participate, or combinations thereof.

4. The method of claim 1, wherein the second user is enabled to extend meeting invitation if the second user is authorized by the first user.

5. The method of claim 1, wherein said one or more third users are further enabled to invite one or more additional users to the meeting, add an additional location to the meeting or add one or more additional resources to the meeting, or combinations thereof.

6. The method of claim 1, wherein invitations to said one or more third users are deleted if the second user is deleted from the meeting.

7. The method of claim 1, wherein changes to the meeting made by the second user or one or more third users or both are sent to the first user for acceptance by the first user.

8. The method of claim 1, wherein an indication of who invited whom, or who added which location, or both are provided as part of information associated with the meeting.

9. The method according to claim 1, further comprising:
preventing the first user, who is an original leader of the meeting, from attending the meeting.

10. A system for enabling meeting extensions using an electronic meeting scheduling system, comprising:
a processor;
an electronic meeting scheduling module operable to run on the processor and further operable to enable a second user invited to a meeting by an invitation from a first user to invite, by using an extended invitation, one or more third users to the meeting, create, based on the invitation from the first user and the extended invitation by the second user, a hierarchical data structure that represents the first user invitation and the extended invitation, and allow the second user to set one or more meeting attributes to be applied to said one or more third users;
said electronic meeting scheduling module further operable to prevent a notification of the extended invitation from being sent to the first user and invitees invited by the first user other than the second user, to apply one or more meeting attributes, set by the second user, to said one or more third users, and to automatically send, based on the created hierarchical data structure, one or more modifications made to said one or more meeting attributes to said one or more third users; and
a shared storage for storing information associated with the meeting, the first user, the second user and said one or more third users,
wherein the meeting is one of a multimedia conference, a teleconference, a video conference and an audio conference, and
said one or more meeting attributes include one or more of: at least time duration of the meeting, time duration within the meeting during which said one or more third users are invited to participate, descriptive information associated with the meeting which said one or more third users can access.

11. The system of claim 10, further including:
allowing the second user to add another location to the meeting or set another communication channel for the meeting or combinations thereof.

12. The system of claim 10, wherein said one or more modifications include: changes to time and date of the meeting, changes to descriptive information associated with the meeting, changes to a list of invitees, changes to the time duration, changes to the time duration within the meeting during which said one or more third users are invited to participate, or combinations thereof.

13. The system of claim 10, wherein invitations to said one or more third users are deleted if the second user is deleted from the meeting.

14. A computer program product embodying a non-transitory computer readable storage device, the non-transitory computer readable storage device storing a program of instructions executable by a machine to perform a method of enabling meeting extensions using an electronic meeting scheduling system, comprising:
enabling, via the electronic meeting scheduling system, a second user invited to a meeting by an invitation from a first user via an electronic meeting scheduling system to invite, by using an extended invitation, one or more third users to the meeting;
creating, based on the invitation from the first user and the extended invitation by the second user, a hierarchical data structure that represents the first user invitation and the extended invitation;
preventing a notification of the extended invitation from being sent to the first user and invitees invited by the first user other than the second user;
applying one or more meeting attributes, set by the second user, to said one or more third users; and
automatically sending, via the electronic meeting scheduling system and according to the created hierarchical data structure, one or more modifications made to said one or more meeting attributes to said one or more third users,
wherein the meeting is one of a multimedia conference, a teleconference, a video conference and an audio conference, and
the one or more meeting attributes include one or more of: at least time duration of the meeting, time duration within the meeting during which said one or more third users are invited to participate, descriptive information associated with the meeting which said one or more third users can access.

15. The computer program product of claim 14, further including:
allowing the second user to add another location to the meeting or set another communication channel for the meeting or combinations thereof.

16. The computer program product of claim 14, wherein said one or more modifications include: changes to time and date of the meeting, changes to descriptive information associated with the meeting, changes to a list of invitees, changes to the time duration of the meeting, changes to the time duration within the meeting during which said one or more third users are invited to participate, or combinations thereof.

17. The computer program product of claim 14, wherein invitations to said one or more third users are deleted if the second user is deleted from the meeting.

18. The computer program product of claim 14, wherein changes to the meeting made by the second user or one or more third users or both are sent to the first user for acceptance by the first user.

19. The computer program product of claim 14, wherein an indication of who invited whom, or who added which location, or both are provided as part of information associated with the meeting.

* * * * *